United States Patent [19]
Watts

[11] 3,815,342
[45] June 11, 1974

[54] GAS FILTER ASSEMBLY
[75] Inventor: Hargus Watts, Mahwah, N.J.
[73] Assignee: Curtis-Wright Corporation, Wood-Ridge, N.J.
[22] Filed: May 3, 1972
[21] Appl. No.: 249,943

[52] U.S. Cl............ 55/493, 52/70, 55/356, 55/504
[51] Int. Cl............................................. B01d 35/00
[58] Field of Search ............. 55/328, 422, 415, 493, 55/467, 482, 484, 356, 357, 504, DIG. 20, DIG. 28; 52/69, 70; 98/59, 60, 122

[56] References Cited
UNITED STATES PATENTS

| | | | |
|---|---|---|---|
| 1,498,173 | 6/1924 | Kelley | 52/69 |
| 1,784,067 | 12/1930 | Holtson | 55/511 |
| 2,336,765 | 12/1943 | Adams | 55/415 X |
| 2,341,245 | 2/1944 | Sonntag | 55/467 X |
| 2,862,306 | 12/1958 | Morrill | 55/422 X |
| 3,520,115 | 7/1970 | Bowen | 55/493 |
| 3,576,095 | 4/1971 | Rivers | 55/484 |

FOREIGN PATENTS OR APPLICATIONS
85,428  1/1957  Netherlands.................. 55/467

*Primary Examiner*—Frank W. Lutter
*Assistant Examiner*—Neil F. Greenblum
*Attorney, Agent, or Firm*—Arthur Frederick

[57] ABSTRACT

The gas filter assembly comprises a casing which has an inlet port means for receiving gas to be filtered and an outlet port means for passing filtered gas to a place of storage or use. A filter means is disposed within the casing between the inlet port means and outlet port means to disentrain solid particles entrained in the gas stream. A portion of the walls comprising the casing are pivotally connected to their fixed or associated wall portions. All of the pivot axes are located close to a common plane so that the pivotal wall portions can be rotated to a folded or collapsed position to reduce its overall size and facilitate transportation of the assembly and then unfolded or extended to its full size position for "field" or on-site erection of the assembly.

16 Claims, 9 Drawing Figures

GAS FILTER ASSEMBLY

DISCLOSURE

This invention relates to gas filters and more particularly, to gas filter assemblies of large size such as employed in industrial gas turbine powerplants for the generation of electrical power, production of compressed air, or pipe line gas pumping.

BACKGROUND OF THE INVENTION

In conventional industrial gas turbine powerplants a gas filter assembly is provided at the turbo-jet engine inlet upstream from a noise suppressor assembly to remove from the air entrained solid particles which might damage the turbine blades or other internal components of the turbo-jet engine. These gas filter assemblies for a 17.5 megawatt electrical power generating station must be large enough to pass air at a rate of about 200,000 standard cubic feet per minute (scfm). To accommodate the volume of air at the aforementioned rates, the gas filter assembly must be of large size, as for example 14 feet long × 14 feet wide × 11 feet high, approximately. Because of the large size of such gas filter assemblies which exceeds the maximum allowable size permissible to pass through many railroad tunnels, the gas filter units are extensively "field" or on-site construction and assembled. It is well known that "field" construction, apart from the difficulty of obtaining the necessary skilled and unskilled workers, is more costly than shop fabrication or erection. The present invention, therefore, contemplates a gas filter assembly which can be substantially completely shop fabricated, shipped to the plant site by railroad and quickly and easily connected to the housing of the inlet noise suppressor or silencer of the powerplant.

It is therefore an object of this invention to provide a gas filter assembly of large capacity which is capable of substantially complete fabrication in the shop, readily transportable, and relatively quickly and easily installed at the plant site.

Another object of the present invention is to provide a gas filter assembly which can be substantially completely shop fabricated and is capable of being readily made more compact in size for purposes of shipment.

A feature of one embodiment of this invention is the pivotal mounting of the filter cell subassemblies which permits the filter cell subassemblies to be rotatably moved to a folded position to thereby achieve a decrease in the overall size of the assembly for transportation to the plant site and, thereafter, unfolded to facilitate field erection.

SUMMARY OF THE INVENTION

The present invention therefore contemplates a novel gas filter assembly comprising a housing or casing consisting of contiguous side and end walls, a top or roof, and a bottom wall or base defining a chamber. The bottom wall has an outlet port which is in communication with a passageway or plenum for receiving filtered gas when the gas filter assembly is attached for use, such as to the silencer of a gas turbine, electrical power generating station. A filter cell subassembly is arranged adjacent opposite end walls and within the chamber. The filter cell subassemblies comprise a support structure or frame to which are connected filters of conventional construction well known to those skilled in the art. The filters may be of the replaceable plate type, roll type, self-cleaning, inertial type or the like.

In accordance with this invention at least one of the end walls is pivotally connected to the end edge portion of the roof for rotative movement about a substantially horizontal axis. A portion of the roof to which the end wall is pivotally connected is hingedly connected to the remaining rigid portion of the roof for movement also about a substantially horizontal axis. A portion of each of the opposite side walls adjacent the pivotally mounted end wall are hingedly connected for rotative movement about a vertical axis. All of the pivot axes are located close to a common vertical plane when the pivotal portions of the roof, side wall and end walls are in the folded or collapsed position. In the unfolded or extended position the pivotal portions of the roof, side wall and end walls define therebetween an inlet space laterally offset from the outlet port and forming part of the filter chamber. The inlet space is in communication, through a bottom opening, with a source of gas, such as the ambient atmosphere for receiving air from the latter.

In one embodiment of the present invention at least one of the filter cell subassemblies adjacent the pivotal end wall is pivotally connected along a horizontal edge portion extending parallel to the end wall so as to be rotatable, from a position overlying the outlet port in the bottom wall, to a position within the inlet space, adjacent the bottom opening. The gas to be filtered is first passed into and through the bottom opening of the inlet space and thence through the filter cell subassembly. From the filter cell subassembly the filtered gas passes into the filter chamber and then through the outlet port to a place of use or storage.

In another embodiment of this invention, the filter cell subassembly is fixedly secured within the filter chamber adjacent to and parallel to the pivotally connected end wall so that, in the unfolded or extended position, the filter cell subassembly is offset from the inlet space. The filter cell subassembly is dimensioned to extend in a vertical plane between the bottom wall and roof. In this embodiment the gas to be filtered passes first into the inlet space through the bottom opening and thence through the filter cell subassembly and into the filter chamber. Thereafter, the filtered gas flows into the outlet port to a place of use or storage.

Thus, the gas filter assembly of this invention is capable of being partly folded so as to have smaller overall dimensions for shipment and can quickly and easily be unfolded at the plant site to thus minimize the amount of field erection necessary to provide an effective gas filter assembly.

BRIEF DESCRIPTION OF THE DRAWINGS

The invention will be more fully understood from the following detailed description thereof when considered in connection with the accompanying drawing wherein two embodiments of the invention are illustrated by way of example, and in which:

FIG. 3 is a fragmentary view with portions of the gas filter assembly shown in FIGS. 1 and 2 broken away;

FIG. 9 is a fragmentary perspective view of the locking linkage employed in the gas filter assembly shown in FIGS. 7 and 8.

DESCRIPTION OF THE PREFERRED EMBODIMENTS

Figure 1:
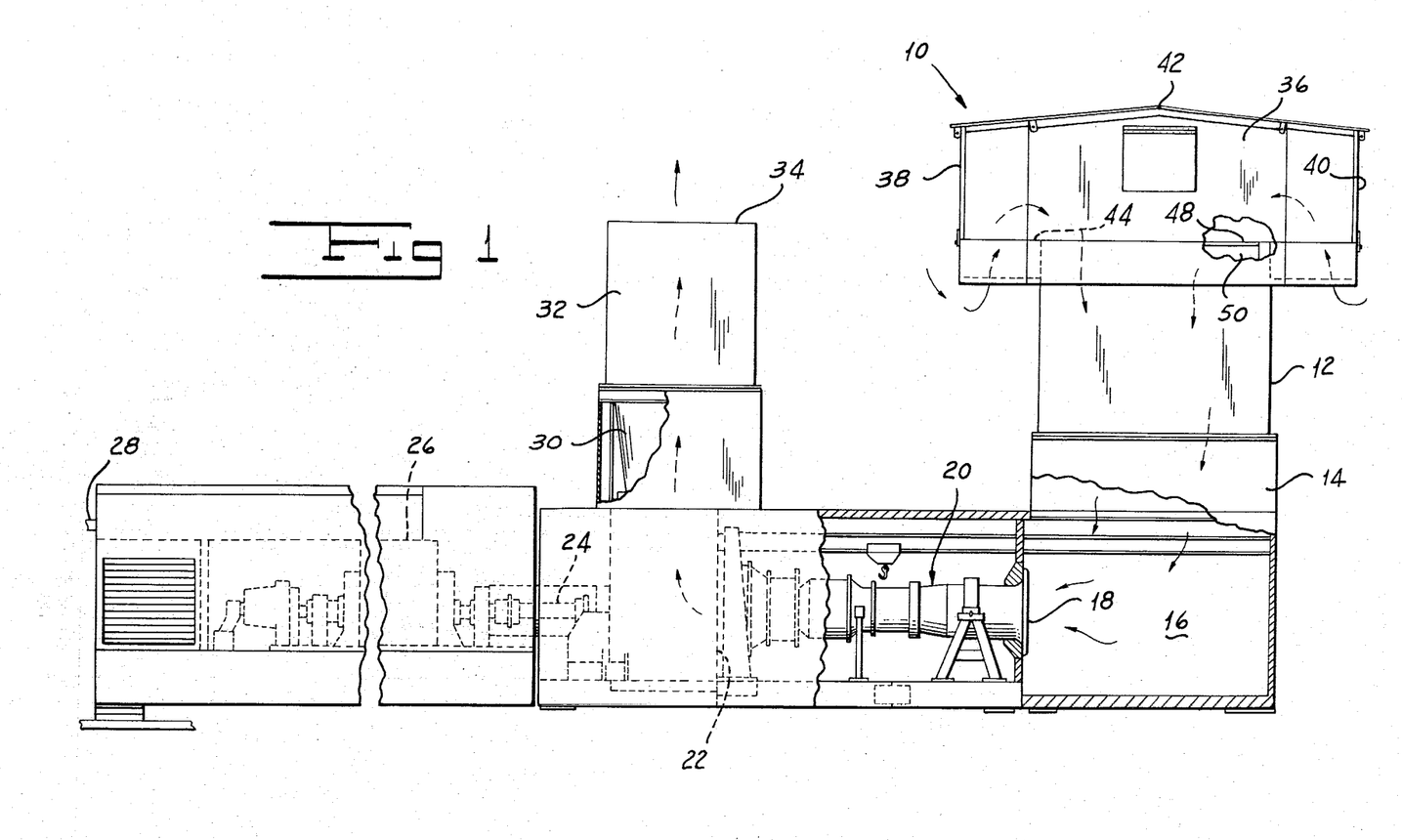
FIG. 1 is a side elevational view of an industrial gas turbine powerplant having a gas filter assembly according to this invention, parts being broken away for illustration purposes only.

Now referring to the drawings and more specifically to FIG. 1 the reference number 10 generally designates a gas filter assembly according to this invention. For purposes of this description, gas filter assembly 10 will be described as part of a gas turbine, electrical power generating plant for the filtering of air before it enters the turbo-jet engine of the plant. While the gas filter assembly will be described as having application to an electrical power generating station for filtering air, it is to be understood that the invention is not limited to such application and has application to other industrial gas turbine powerplants for filtering air or other gases without departing from the scope and spirit of this invention.

As shown in FIG. 1, gas filter assembly 10 which forms part of an industrial gas turbine powerplant is connected to the top of an inlet noise suppressor or silencer 12 to pass air from which solid particles have been removed to the latter. The silencer 12 is mounted atop an inlet module 14 and is in communication with the latter to pass filtered air to the inlet module. The inlet module 14 defines an inlet plenum 16 which passes filtered air into the air inlet 18 of a turbo-jet engine 20. The high velocity gaseous discharge from turbo-jet engine 20 is directed into a gas turbine 22 which is connected, through a shaft 24, to an electrical generator or alternator 26, the current generated being conducted to a place of use by a high voltage duct 28. The combustion gases leave the gas turbine 22, through a transition duct 30, which is mounted on the turbine exhaust volute (not shown), to receive exhaust gases from the latter. An exhaust silencer 32 is connected to the top of transition duct 30 to receive the exhaust gas from the duct, the silencer 32 discharging the spent combustion gas to the atmosphere through an outlet 34.

As best shown in FIGS. 1 to 4, gas filter assembly 10 comprises a casing consisting of a plurality of contiguous walls preferably four in number. As illustrated, the casing comprises opposite side walls 36 (only one of which is shown in the drawings), opposite end walls 38 and 40, a top wall or roof 42 and a bottom wall or base 44. The side and end walls, roof 42 and base 44 are contiguously arranged to define therebetween a filter chamber 46. Each of the walls 36, 38 and 40 and roof 42 is of conventional construction consisting of frame elements, such as angle irons, to which a sheathing formed of sheets or plates is secured by bolting, welding, riveting or the like. The base 44 also comprises a frame which defines an outlet port 48, the frame being dimensioned for attachment to silencer 12 so that outlet port 48 is in registry with the air inlet 50 of the silencer. The casing is dimensioned so that two opposite portions 52 "overhang" silencer 12. These two overhanging portions 52 each define rectangular shaped air inlets 54. To filter the air drawn into air inlets 54, filter cell subassemblies 56 are supported in each of the gas inlets 54 for pivotal movement as will be more fully described hereinafter.

Each of the filter cell subassemblies 56 may comprise, as shown, a frame 58 which includes, at one end, a plate 60 and is dimensioned to extend substantially the full length of end wall 38 and occupy the space between end wall 38 and base 44. The frame 58 includes channels which are arranged to slidably receive and support a plurality of replaceable plate-type filter cells 62 arranged in a chevron pattern. Each of the subassemblies 56 is pivotally connected at its frame 56 on the side opposite of plate 60. The pivotal connection may be of any suitable type and may comprise a plurality of spaced hinge elements 64. Each hinge element 64, as shown, may consist of a tongue 66 connected to frame 56 to extend between two spaced parallel ears 68 which are connected to and project from the base 44. A pivot pin or bolt 70 passes through aligned holes in tongue 66 and ears 68 to pivotally connect the tongue and ears together.

Although the filter cell subassemblies 56 have been shown and described as having replaceable plate type filter cells of the type such as the glass fiber type 5700 industrial filter manufactured by American Air Filter Company, Inc., Louisville, Kentucky and sold under the trademark "Rem-Kleen," the invention is not limited thereto and filter cell subassemblies may include filter cells 62 of type PL–24 sold under the trademark "AIRMAT" by American Air Filter Company, Inc. The roll-type filter cell of the type V, model G manufactured by American Air Filter Company and sold under the trademark "ROLL-O-MATIC" may also be mounted on a pivotally connected frame 58. Also within the scope and spirit of this invention is the use of self-cleaning filters manufactured by Farr Company, Falls Church, Virginia and sold under the trademark "DYNAVANE."

Since air filter assemblies 10 which are capable of passing air at a rate of about 200,000 standard cubic feet per minute (scfm) are of such a large size that they cannot be transported by railroad to many powerplant sites, they must be only partially fabricated at the place of manufacture and then "field" or on-site completed after delivery. Therefore, in accordance with this invention, overhanging portions 52 of air filter assembly 10, are made foldable or collapsable to provide substantially complete fabrication at the factory and thereby minimize field fabrication and assembly. While the gas filter assembly 10 has been described and the drawings illustrate the assembly 10 as having two foldable overhanging portions 52, it is to be understood that the assembly 10 may only have one foldable overhanging portion without departure from the scope and spirit of the invention. Since the two foldable overhanging portions 52 shown in the drawings are of identical construction, only one will be described.

Figure 2:
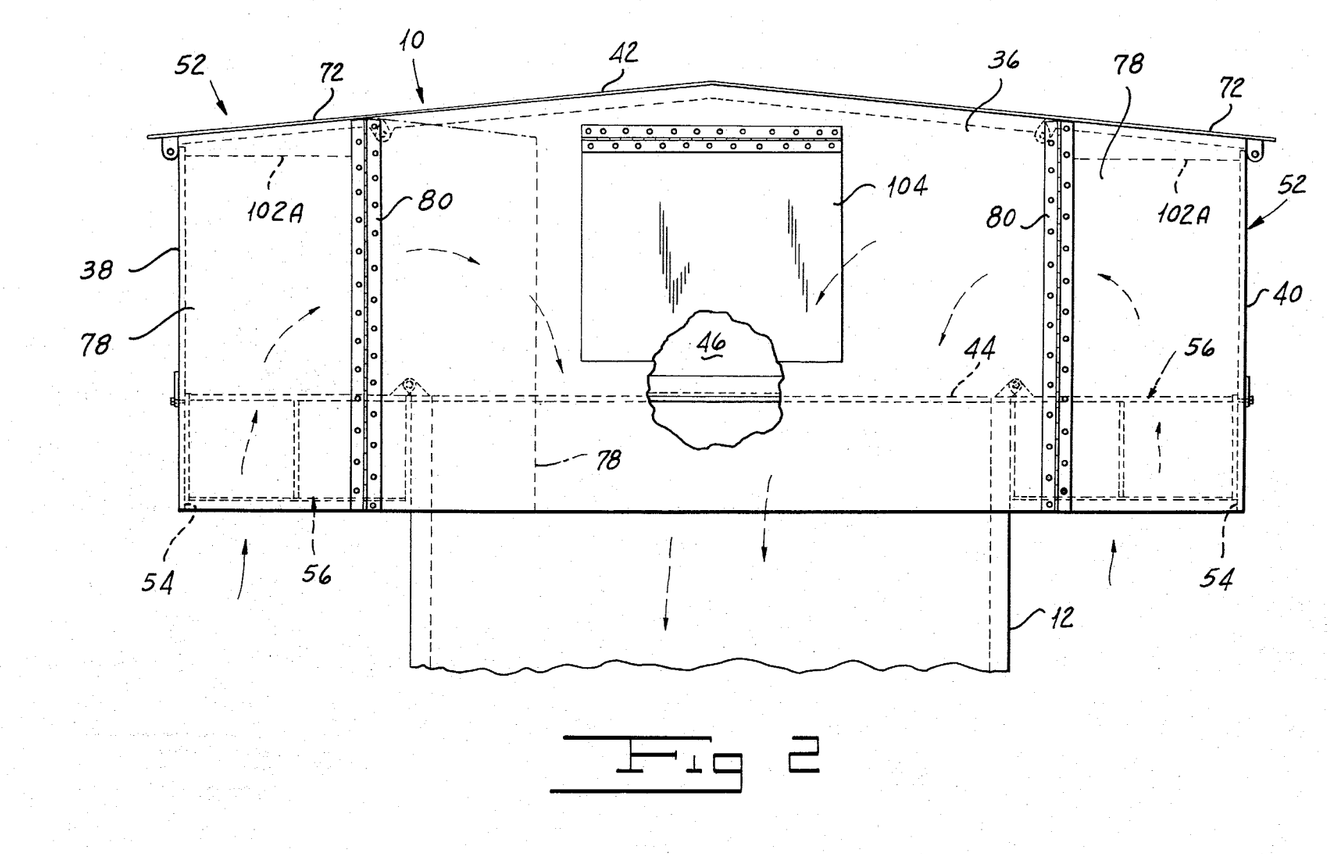
FIG. 2 is a fragmentary view showing the gas filter assembly shown in FIG. 1 on an enlarged scale.
Figure 4:
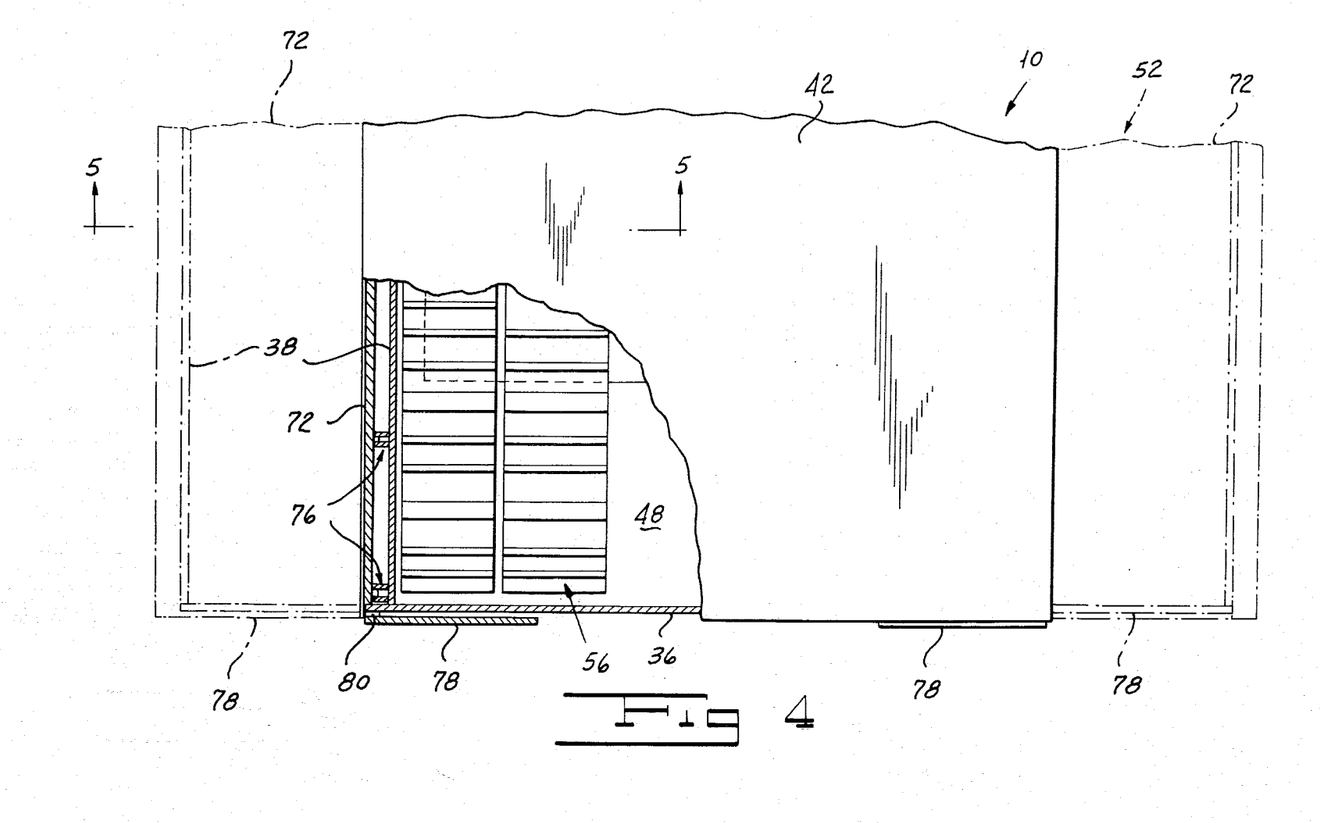
FIG. 4 is a fragmentary plan view of the gas filter assembly shown in FIGS. 1 to 3 in the folded position for shipment.
Figure 5:
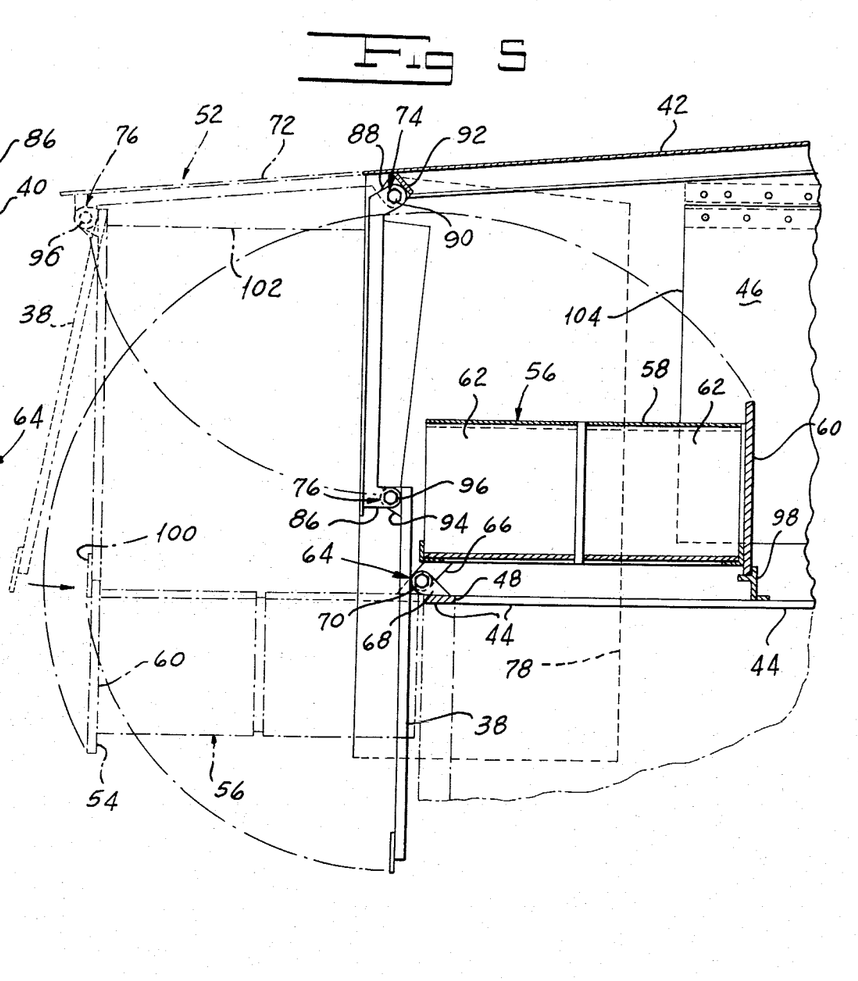
FIG. 5 is a cross-sectional view taken substantially along line 5—5 of FIG. 4, somewhat enlarged.
Figures 5, 6:
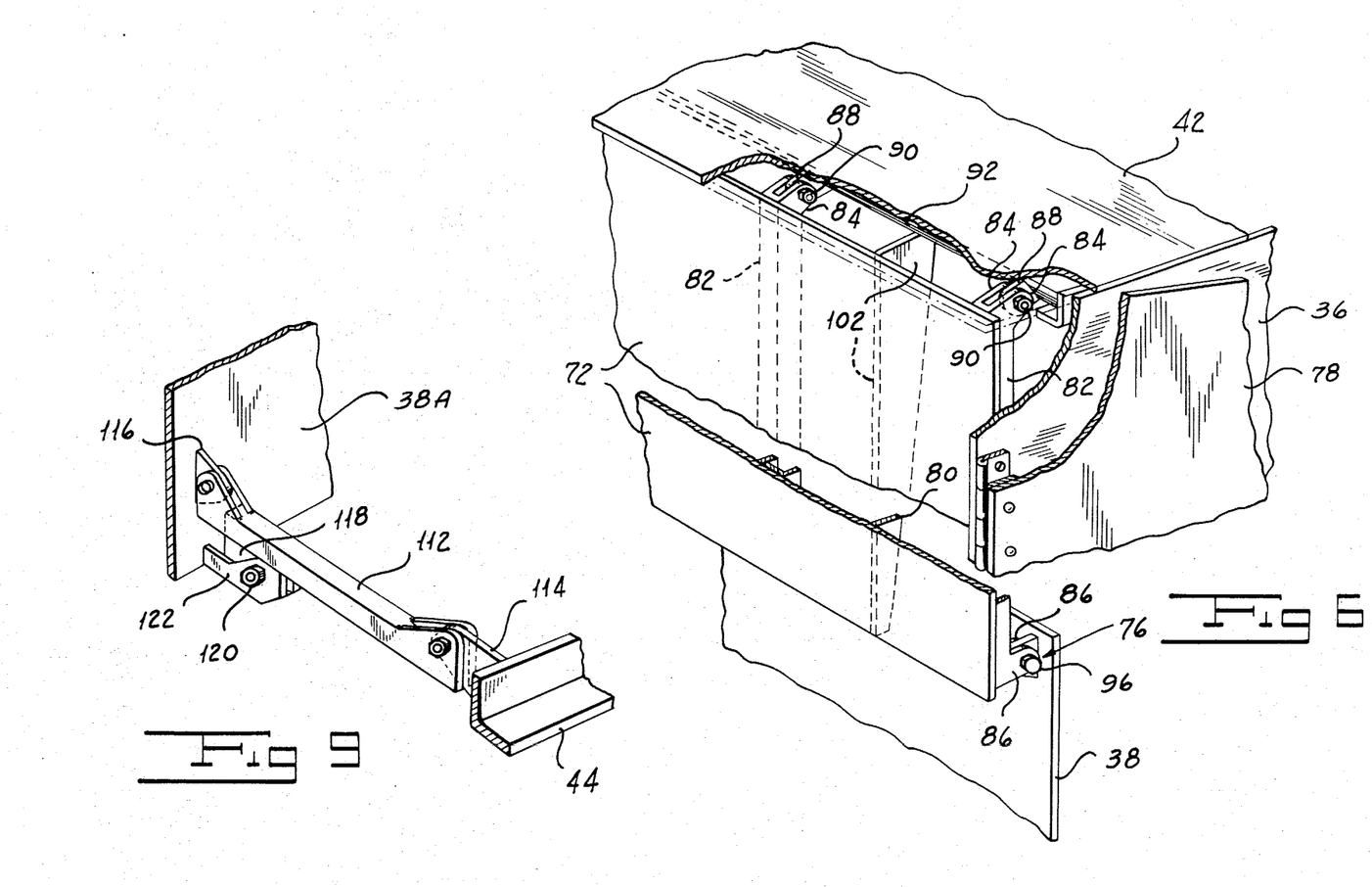
FIG. 6 is an enlarged fragmentary view of the gas filter assembly when in the folded position and with parts broken away to better illustrate the construction of the assembly.
Figure 6:
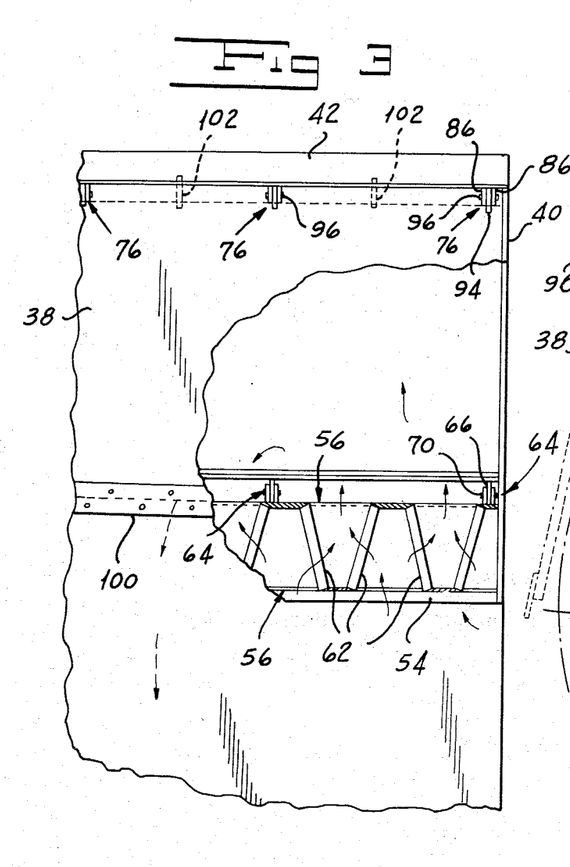

As best illustrated in FIGS. 4 and 5 in which the overhanging portions 52 are shown in the folded or collapsed position for shipment and the extended or unfolded positions are shown in dot-dash lines, each of the overhanging portions 52 is constructed of a plurality of pivotally connected end and side wall and roof portions. More specifically, roof 42 has a roof section 72 pivotally connected by a plurality of spaced hinge elements 74 to the remaining, fixed portion of roof 42. To the distal end edge of roof section 72 is pivotally connected an end wall 38. The roof section 72 and end wall 38 are connected together by a plurality of horizontally spaced hinge elements 76. As best shown in FIGS. 2 and 6, each of the side walls 36 has a portion or section 78 which is pivotally connected by a piano hinge 80 to the remaining fixed portion of the associated side wall. Each of the sections 72 and 78 are dimensioned so that the pivot axes of hinges 74 and 76 lie close to a vertical plane containing the axis of piano hinges 80 when the overhanging portion 52 is in the folded position.

Each of the hinge elements 74 and 76 comprises a U-shaped channel 82 which is secured to roof section 72 by welding, bolting or the like. The opposite end portions of channel 82 are enlarged to provide spaced sets of ears 84 and 86 which form part of the respective hinge elements 74 and 76. A tongue 88, which forms part of each hinge element 74 is disposed between and is pivotally connected to a set of ears 84 by a pin or bolt 90. Each of the tongues 88 is connected to and projects from a bar 92 which constitutes a part of the frame of roof 42. At the opposite end of channel 82 a tongue 94 extends between each set of ears 86 and is pivotally connected to the ears by a bolt or pin 96. Each tongue 94 of hinge element 76 is suitably connected, as by welding, bolting or the like, to end wall 38 adjacent one edge portion of the end wall.

When the foldable overhanging portions 52 are in the folded position shown in FIG. 5, filter cell subassemblies 56 are supported within chamber 46 to overlie base 44 by a footing plate 98 which extends and is connected to opposite side members of base 44. With filter cell subassembly 56 in the folded position in chamber 46, roof section 72 and end wall 36 lie in substantially vertical planes adjacent base 44 and side wall sections 78 are swung back against side walls 36 as best shown in FIG. 6. For shipment, roof section 72, end wall 38, side wall sections 78, and filter cell subassembly 56 are suitably braced and secured against inadvertent movement. In this folded and packed condition, gas filter assembly 10 is compact and capable of shipment by railroad to any destination without concern for the size of the railroad tunnels.

After delivery of gas filter assembly 10 to the plant site, roof section 72 and end wall 38 are unbraced and freed and rotated clockwise as viewed in FIG. 5 about hinge elements 74 to the dot-dash position shown in FIG. 5. Thereafter, filter cell subassembly 56 is rotated counterclockwise as viewed in FIG. 5 about hinge elements 64 to the position shown by the dot-dash lines. The end wall 38 is then swung about hinge elements 76 to a position in coplanar relation to plate 60 of filter cell subassembly 56 and secured to plate 60 by a connecting strap 100. The connecting strap may be secured to plate 60 and end wall 38 by any suitable means, such as by welds, rivets, and/or bolts. Thus, filter cell subassembly 56 is supported by hinge elements 64 and along the opposite end by end wall 38. To strengthen roof section 72 for supporting the load of filter cell subassembly 56 and side wall 38, a plurality of spaced stiffening ribs 102 (only one being shown in FIG. 5) are secured to the inner surface of roof section 72. Thereafter, side wall sections 78 are rotated about their respective piano hinges 80 to abutment against the ends of end wall 38 and roof section 72. By suitable means (not shown) such as straps, latches or the like, side wall sections 72 are secured in the unfolded position to end wall 38.

With gas filter assembly 10 secured to silencer 12 and the turbo-jet engine 20 in operation, air is drawn into chamber 46 through air inlets 54 and into and through filter cell subassemblies 56. Any air entrained solid material of objectionable size is removed from the air stream by the filter cell subassembly 56 so that relatively clean air is passed through outlet port 48 into silencer 12 and thence into the inlet 18 of turbo-jet engine 20. In the event filter cell subassemblies 56 become clogged to an extent where insufficient air would be permitted to flow to turbo-jet engine 20, a by-pass opening controlled by a door or flap 104 is provided in side walls 36 of the casing of gas filter assembly 10. Each of the flaps 104 is hingedly secured along its top edge to its associated side wall 36 and is weighted by means, not shown, so as to swing to an open position to an extent dependent upon the pressure differential across the flap. Thus, flaps 104 function to by-pass the proper amount of air which may be required to make up for losses resulting from partially clogged filter cells 62.

Figure 7:
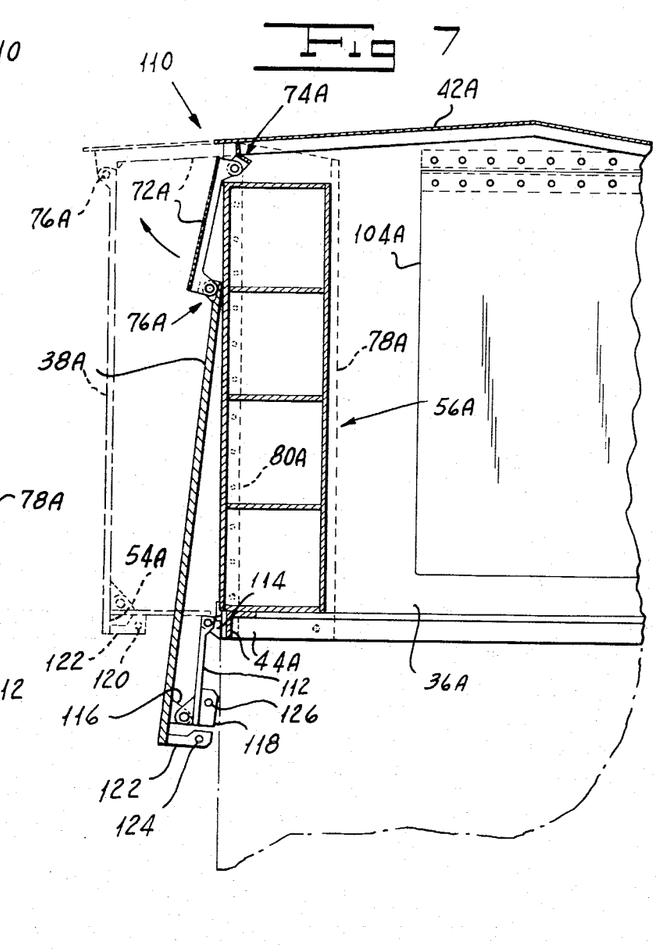
FIG. 7 is a fragmentary cross-sectional view, similar to FIG. 5, of a gas filter assembly according to another embodiment of this invention, shown in a folded position.
Figure 8:
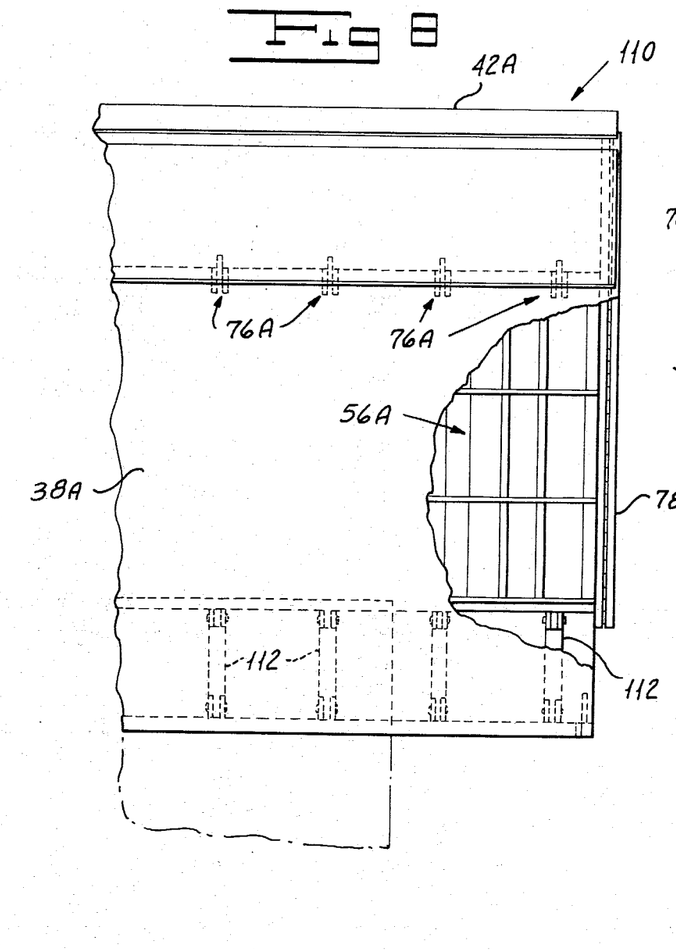
FIG. 8 is a fragmentary view in cross-section of the assembly shown in FIG. 5.

In FIGS. 7 and 8 is shown another embodiment of the present invention. In this embodiment, gas filter assembly 110 differs principally from gas filter assembly 10 by providing a filter cell subassembly which is fixed and not pivotally connected as is filter cell subassembly 56 of gas filter assembly 10. In view of the close similarity of the assemblies, the parts of gas filter assembly 110 corresponding to like parts of gas filter assembly 10 will be identified by the same number but with a suffix A added thereto.

In gas filter assembly 10, filter cell subassembly 56A is fixedly mounted on base 44A adjacent foldable overhanging portion 52A. Subassembly 56A is dimensioned to extend between side walls 36 and vertically between base 44A and roof 42A. Since filter cell subassembly 56A is not disposed when in the unfolded position in the air inlet 54A, as is filter cell subassembly 56 of gas filter assembly 10 (see FIG. 5), roof section 72A and end wall 38A are held in the unfolded position shown by the dot-dash lines in FIG. 7 by a plurality of laterally spaced arms or links 112.

As is best illustrated in FIG. 9, each of the links 112 is pivotally connected, at one end, to tongues 114 projecting from base 44A and, at the opposite end, pivotally connected to a tongue 116 which projects from end wall 38A. To lock link 112 in the extended or horizontal position, a flange 118 depends from the link and is secured by a pin or bolt 120 to a bracket 112 which is attached to end wall 38A. As best shown in FIG. 7, bracket 122 and flange 118 have a hole 124 and 126, respectively, which, when foldable portion 52A is unfolded and links 112 are in their extended position, are in registry to receive therethrough bolt 120. The space between end wall 38A and side walls 36A is closed by a side wall section 78A which, as is side wall section 78, is hingedly secured to the fixed portion of side walls 36A.

In the gas filter assembly 110 shown in FIGS. 7 to 9, the assembly 110 is made relatively compact for transportation when foldable overhanging portion 52A is folded as shown in FIG. 7 and can be quickly and easily unfolded at the plant site.

It is believed now readily apparent that the present invention discloses a gas filter assembly which is capable of substantially complete factory fabrication and assembly and which can be made quickly and easily compact in size to facilitate shipment. It is a gas filter assembly which can be field erected and installed with a minimum of effort by relatively unskilled labor.

Although two embodiments of the invention have been illustrated and described in detail, it is to be understood that the invention is not limited thereto. Various changes can be made in the arrangement of parts without departing from the spirit and scope of the invention as the same will now be understood by those skilled in the art.

What is claimed is:

1. A gas filter assembly comprising:
   a. a casing;
   b. said casing comprising contiguous side and end walls, a roof, and a base with the side walls and roof dimensioned so as to extend beyond at least one side of the base to provide a casing portion overhanging the latter;
   c. an inlet port means and outlet port means in the casing to respectively receive a gas to be filtered and pass filtered gas to a place of use or storage;
   d. a filter means disposed within said casing between the inlet port means and outlet port means for removing undesirable material from the gas stream flowing from the inlet port means to the outlet port means; and
   e. said side wall and roof portion extending beyond the base to form said overhanging casing portion being separate sections pivotally connected to their respective other portions and with the end wall overhanging the base pivotally connected to the overhanging roof section of said roof so that the separate side wall and associated end wall may be moved to a folded position and thereby provide the assembly with a smaller volumetric size to facilitate its transportation.

2. The apparatus of claim 1 wherein said side wall and roof portion are dimensioned so as to extend at opposite ends beyond the opposite sides of the base and wherein each of the opposite end walls is pivotally connected to the adjacent overhanging roof section of the roof.

3. The apparatus of claim 1 wherein said filter means includes a frame pivotally connected along an edge extending parallel to the end wall so as to be movable from a position overlying said base to a position within the overhanging portion to receive gas to be filtered passing through said inlet port means.

4. The apparatus of claim 1 wherein all of the axes of the pivotal connections in the folded position of said wall sections lie close to a common vertical plane.

5. The apparatus of claim 1 in which locking means is provided to secure the wall sections in the unfolded position.

6. The apparatus of claim 5 wherein said locking means comprises a plurality of spaced links, each link being pivotally connected at one end to a casing wall and at the opposite end pivotally connected to the base.

7. The apparatus of claim 6 wherein a bracket is secured to said casing wall adjacent each link and connecting means engaging the bracket and adjacent link to lock the latter against pivotal movement.

8. The casing of claim 1 wherein said overhanging casing portion is open at the bottom to thereby define said inlet port means.

9. The casing of claim 1 wherein all of the axes of said pivotal connections in a folded position are disposed close to a vertical plane passing through the base.

10. The casing of claim 1 wherein a pivot means is provided to engage the filter means so that the latter can be moved from a position overlying the base to a position within the overhanging casing portion.

11. The casing of claim 1 wherein locking means is provided to secure the pivotal wall and roof portions in the unfolded position.

12. The casing of claim 11 wherein said locking means comprises a plurality of spaced links, each link being pivotally connected to said connecting wall to the base.

13. A gas filter assembly for a gas inlet duct comprising:
   a. a casing having a plurality of contiguous walls, defining a chamber therebetween and dimensioned so as to be substantially larger than the dimensions of said duct;
   b. an inlet port means and an outlet port means in the casing to respectively receive a gas to be filtered and pass filtered gas to a place of use or storage;
   c. said casing being connected to the gas inlet duct so that the outlet port means is in communication with the passageway defined by said duct and at least one portion of the casing overhangs the duct;
   d. a filter means disposed within said casing between the inlet port means and outlet port means for removing undesirable material from the gas stream flowing from the inlet port means to the outlet port means and through the passageway of said duct to a place of use or storage; and
   e. said overhanging casing portion comprising wall sections adjacent each other and pivotally connected so that the sections may be moved to a folded position providing the gas filter assembly with a dimension in one direction substantially that of the duct to facilitate transportation of the gas filter assembly prior to connection to said duct.

14. The apparatus of claim 13 wherein said filter means is pivotally connected so as to be movable from a position overlying said duct to a position within the overhanging portion of the casing.

15. The apparatus of claim 13 wherein said overhanging portion of the casing is open at the bottom to form said inlet port means.

16. The apparatus of claim 13 wherein all of the axes of the pivotal connections in the folded position of said wall sections lie close to a common vertical plane.

* * * * *